United States Patent [19]
Peters

[11] 3,771,309
[45] Nov. 13, 1973

[54] LIGHT-CORD-CONCEALING CHAIN DEVICE

[76] Inventor: Donald E. Peters, 81 Rustic Pl., Staten Island, N.Y. 10308

[22] Filed: Mar. 21, 1972

[21] Appl. No.: 236,677

[52] U.S. Cl. .................................. 59/78.1, 59/80
[51] Int. Cl. ........................................... F16g 15/14
[58] Field of Search ..................... 59/78.1, 78, 80, 59/82, 91, 90, 35; 191/12 C; 248/49, 317

[56] References Cited
UNITED STATES PATENTS

| 23,303 | 3/1859 | Lancelott | 59/35 |
| 929,968 | 8/1909 | Mornath | 59/78.1 |
| 1,047,568 | 12/1912 | Riess | 59/78.1 |
| 1,187,122 | 6/1916 | Andersen | 248/317 |

Primary Examiner—Charles W. Lanham
Assistant Examiner—Gene P. Crosby
Attorney—William T. Hough et al.

[57] ABSTRACT

In a preferred embodiment, a chain-link element having a shape making it easily combinable with other such chain-link elements to produce a chain of the chain-link devices in linear series with one another attaching either directly to one another in the series or connected by an interconnecting link element such as a ring or an I-shaped structure, each of the chain-link devices including centrally thereof an aperture receivable of a light cord such that the light cord is extendable straight upwardly and downwardly through the center of the chain along the longitudinal axis of the series of interconnected chain-link devices.

13 Claims, 11 Drawing Figures

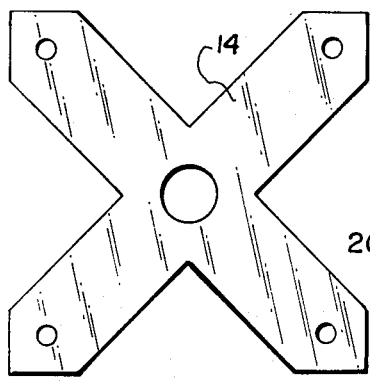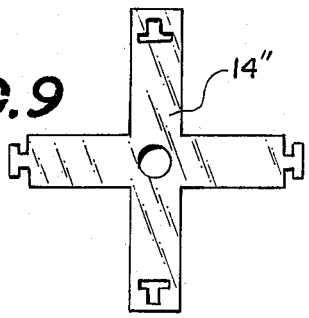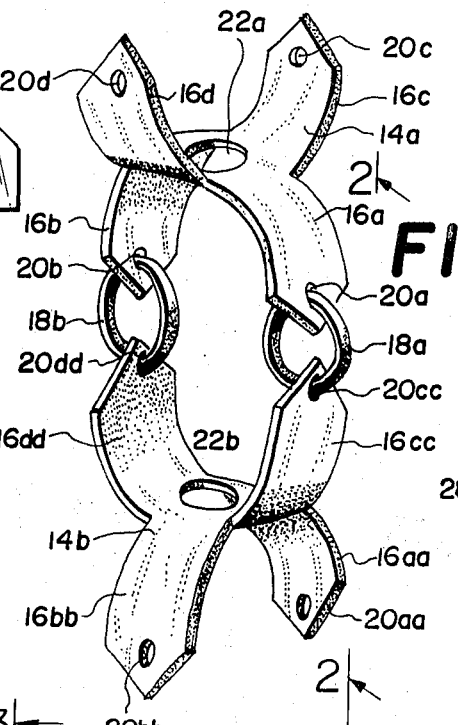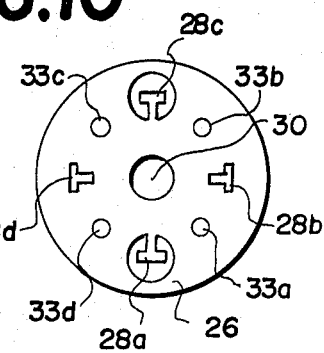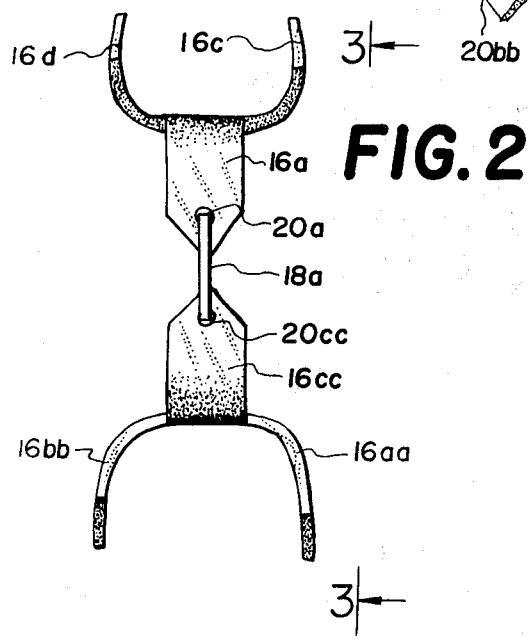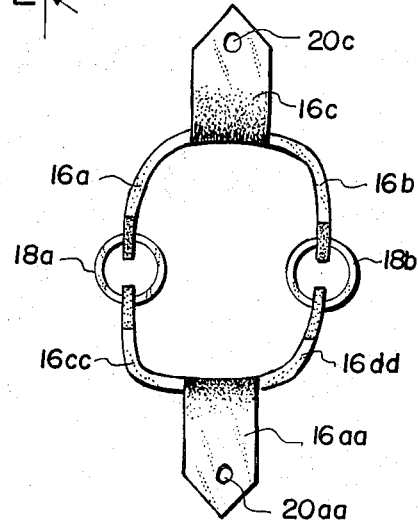

LIGHT-CORD-CONCEALING CHAIN DEVICE

This invention relates to a novel structure, particularly adaptable to hanging light fixtures.

BACKGROUND TO THE INVENTION

Prior to the present invention there have existed various chain-link devices of differing structures constructed particularly for the concealing of a light cord at least sufficiently that the light cord is less unsightly while the chain concurrently offers support to a light fixture to which the electric cord is connected. Typical of such patents are for example the U.S. Pat. No. 1,718,368, in which two bilateral upright members are brought together on opposite sides of the cord to define an upright channel extending between the two members brought to- gether, and the U.S. Pat. No. 1,047,568 in which each of the rather conventional links have an aperture in the upper and lower portion of each link to which the cord is insertable, and the U.S. Pat. No. 929,968 in which the cord is totally concealed by complicated link structures and intermediate linking structures matable with one another, as well as the U.S. Pat. No. 966,626 which basically is similar to the U.S. Pat. No. 1,047,568, also discloses a series of links having upper and lower peripheral openings additionally including however a tubular structure circled through the length of the consecutive linked chain links.

With regard to for example each of the U.S. Pat. Nos. 1,047,568 and 966,626, for example, as is typically true with any conventional chain, the chain is normally preformed with all links already attached and it is less than easy or convenient or economical to either shorten a chain by removing links or to lengthen a chain or to conveniently go through the motions of inserting a cord through the various apertures of the consecutive links of the chain. With former chains particularly of the type described above there has also been the problem either of chafing by virtue of the light cord having consecutive links adjacent to one another a common point on the cord twisting in opposite directions such as to chafe cord and create and electrical or fire hazard, and there has been also the problem of the matter of economics in the cost of manufacture of links where the apertures and/or structures are such that complicated machinery and/or manual labor is required thereby placing such devices out of realistic pricing ranges for ready and extensive use by the public. Additionally, the need for a multiplicity of parts not only complicates the manufacture but also adds to the cost. Additionally, of particular concern to the electricians or other installers of such fixtures and chains, there is the problem of keeping up with as well as purchasing multiple parts particularly in the right proportions.

SUMMARY OF THE INVENTION

It is an object of the present invention to overcome one or more of the above-type problems and/or difficulties.

Another object of the present invention is a link structure combinable with other such structures to form a complete link.

Another object is to obtain a link requiring few if any additional parts for the forming of a chain of any desired length.

Another object is to obtain a link-device easily joinable with or removable from other link devices of similar structure.

Another object is to obtain a decorative chain for at least partially concealing unsightly light cords of light fixtures.

Other objects become apparent from the preceding and following disclosure.

One or more of the preceding objects are obtained by the invention as defined herein.

Broadly the invention includes a new type chain-forming structure and/or combination of structures, in a preferred embodiment having an aperture therethrough for receiving an electric cord such as would support or lead to a light fixture. The basic link structure element of the present invention is a sheet-type material having either inwardly extending slits from various points around the periphery of the sheet of about symmetrical configuration such as a square, a circle (i.e., a disk), or having cut-out portions such as to form shapes such as a star, a plus-sign (i.e., a cross), or the like, with at least a plurality of downwardly extending or extendable legs and a plurality of upwardly extending or extendable legs. That is to say, the composition of the sheet from which the central portion and radially extending legs are formed may be of a substantially rigid material such that by preforming the respective legs of the structure may be preshaped into for example two oppositely located upwardly angled legs or separated from one another by two downwardly angled oppositely located legs, or on the other hand the material may be such that it has resiliency such as would be characteristic of spring-steel alone or coated with a plastic such as polypropylene or of polypropylene alone such that although formed in a flat state, the legs are resiliently bendable downwardly for connecting to the legs of similar next consecutive structures in the formation of a chain, whereby the resiliency serves to attempt to return the legs to their normal position thereby offering a form of support to the lower hanging chain links and to any weight or chandelier or the like supported on a lower end thereof. In one embodiment, each link structure has at about a peripheral end of its respective legs, typically four legs, a projection and head thereto for inserting into a slot and locking itself into the slot or alternatively a slot such as typically a T-shaped slot through which the enlarged head slips through the cross-portion of the T and the neck of the projection slides down the base of the T to a locked position of adjacent link structures. In other embodiments, all legs might merely include either linear slots or T-shaped slots such as noted above or may alternately just include an aperture through which a ring, for example, may be suitably inserted for the linking of consecutive link structures. Where each of the members includes one or more of the narrow slots or T-shaped slots, there may be an intermediate linking structure other than a ring such as typically an I-shaped member or typically with an arrow-shaped or pointed-end shaped structure including a locking leg, for example.

The invention may be better understood by reference to the following figures.

THE FIGURES

FIG. 1 illustrates a side perspective view of a typical combination of serially arranged and linked-link-structures of the present invention.

FIG. 2 illustrates a typical side view as taken along lines 2—2 of FIG. 1. p FIG. 3 illustrates a typical side view as taken along lines 3—3 of FIG. 2.

FIG. 4 an elevation plan view of a single link structure such as that utilized in FIG. 1 as it appears in an initial cut-out form when either made of a resilient planar sheet metal or resilient plastic.

Figure 5:
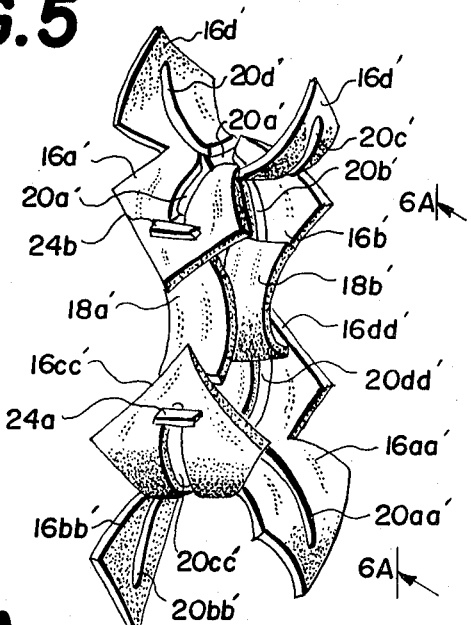

FIG. 5 illustrates a side perspective view of an alternative embodiment to that of FIG. 1.

Figure 6A:
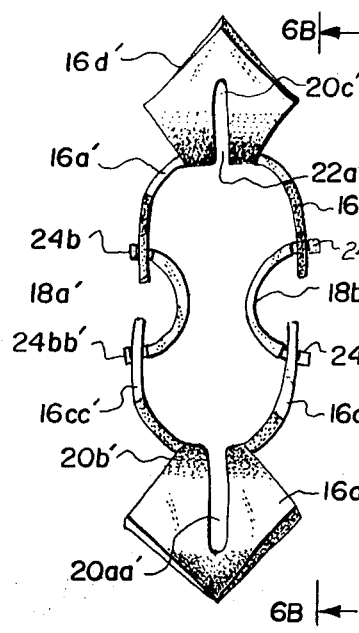
Figure 6B:
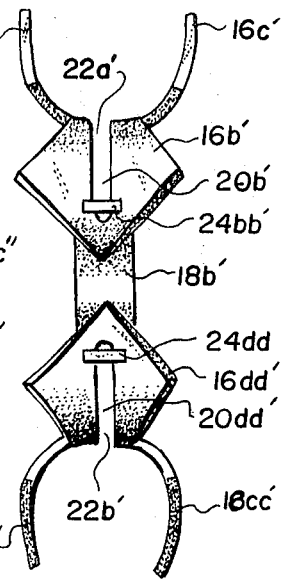

FIG. 6A illustrates a side view taken along lines 6A—6A of FIG. 5, whereas FIG. 6B illustrates a view as taken along lines 6B—6B of FIG. 6A.

Figure 7:
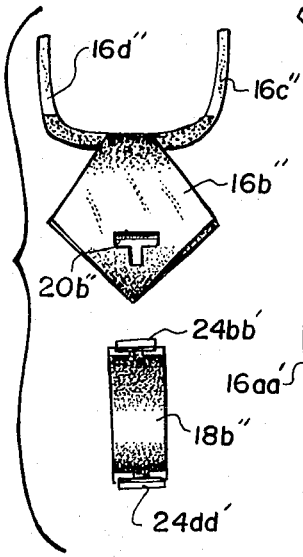

FIG. 7 illustrates in exploded view typically a first link structure of FIG. 6B and the intermediate linking I-shaped connector, as shown in side view corresponding to that of FIG. 6B.

Figure 8:
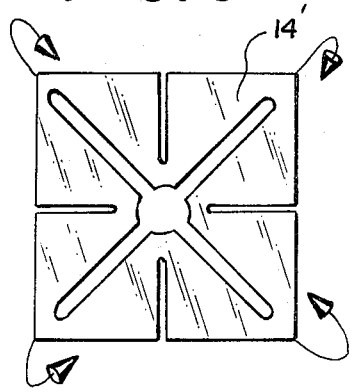

FIG. 8 illustrates an elevation plan view of a cut-out either of a resilient metal or plastic or of a non-resilient material prior to bending, the element being represented in its bended state and connected by a connector to another identical cut-out structure as illustrated in FIG. 5.

FIG. 9 illustrates an elevation plan view of an alternative embodiment in which no connector is required, the end portions of each of the radially extending legs having either a connector projection associated therewith or a connector projection receiving T-slot.

FIG. 10 illustrates a typical structure of any shape but represented in this Figure as disk-shaped having four connector sites for receiving connectors such as illustrated in FIGS. 6A, 6B, or 7, or for receiving the connector leg-ends of a structure such as illustrated in FIG. 9, there being additionally the central hole therein for passage of an electric cord and there being screw holes also present.

DETAILED DESCRIPTION OF THE INVENTION

In greater detail, FIG. 1 illustrates a typical chain portion 12 composed of interconnector links structures 14a and 14b having typically downwardly turned legs 16a and 16b, 16aa and 16bb, and upwardly turned legs 16c and 16d and 16cc and 16dd, with connectors 18a and 18b connecting respectively legs 16a and 16cc and legs 16b and 16dd by the rings 18a passing through apertures 20a and 20cc, with connector 18b extending through holes 20b and 20dd.

FIG. 2 illustrates a side view taken along lines 2—2 of FIG. 1 illustrating the same parts similarly, from a view taken along lines 3—3, FIG. 3 illustrates the same parts.

FIG. 4 illustrates an alternative embodiment and corresponds in view thereof and in corresponding parts to that of FIG. 1. However, in the particular embodiment of FIG. 5, the connector-receiving slots such as 20a', 20b', 20c', and 20d', all are of one unified space continuous with a central electric cord receivable space 22a', corresponding to the hole 22a of FIG. 4. Also in the embodiment of FIG. 5, connectors 18a' and 18b' are I-shaped curved members having enlarged T-shaped heads 24b, and 24a', typically. Although the embodiment of FIG. 5 illustrates primarily the legs being principally downwardly turned and upwardly turned respectively of each link structure, there is also a slight degree of twist in a preferred embodiment as illustrated, but the twist may be substantially greater than that illustrated. Showing different views thereof, FIG. 6A and FIG. 6B illustrate the same corresponding parts of FIG. 5.

FIG. 7 illustrates an alternative embodiment in which there is merely a T-shaped slot 20b'' for receipt of a T projection 24dd', for example, with the base or leg of the T pointing radially outwardly from the center of the link structure. FIG. 4 illustrates the typical appearance of the link structure of FIG. 1 before bending or in such an embodiment in which the composition of the link structure is resilient so that it appears in this form except when in use by virtue of connectors holding the bended shape when the links are subjected to a weight such as that of the weight of a chandelier.

Similarly, FIG. 8 corresponds to the appearance before bending or flexing of the link structure of the type utilized in FIG. 5. FIG. 9 illustrates an alternative and preferred embodiment in which no connectors are necessary because the connecting mechanism or means are a part of each of the respective leg(s). Thus, FIGS. 4, 8 and 9 respectively illustrate typical basic cut-out or molded structures 14, 14' and 14''.

FIG. 10 illustrates a typical mount disc 26 locatable at either or each of opposite ends of an assembled chain such as that of FIG. 5, with connector structures and holes such as structure 28a, hole structures 28b, 28c and hole 28d, cord hole 30, and screw holes 32a, 32b, 33c, and 33d.

Insulator inserts may if desired, by inserted into the link cord-holes. Typical metals usable are steel, iron, copper, brass, tin, aluminum and the like. Typical plastics are preferably polypropylene, but also any of the acrylics and/or polyvinyls, preferably fireproof.

It is within the scope of the invention to make such modifications, and substitutions, and variations or embodiments, shapes, and parts as would be apparent to a person of ordinary skill.

I claim:

1. An electric cord chain-link device comprising in combination: a substantially thin sheet material having a central annular portion defining an upright channel and having extending radially laterally a plurality of leg members including at least two separate extending leg members angling upwardly and at least two other separate leg members angling downwardly; each of said leg members being shaped at about its distal end such that each of said upwardly two angled leg members is linkable to at least one of each of said two downwardly angled leg members of an adjacent link, and each of said two downwardly angled leg members is linkable to at least one of each of said two upwardly angled leg members of an adjacent link.

2. A device of claim 1, including attaching means for linking said upwardly and said downwardly angled members.

3. A device of claim 2, in which said material is at least semi-rigid, in which said sheet composition has an about symmetrical peripheral configuration, and in which said upwardly and downwardly angled leg members alternate along said peripheral configuration.

4. A device of claim 3, in which a substantially flat sheet of about square shape including radially-inwardly extending slits defining therebetween radially outwardly extending projections is said sheet material preformed into said central annular portion and said plurality of leg members, said plurality being said projections.

5. A device of claim 4, in which said projections extend about diagonally outwardly of and from said central portion.

6. A device of claim 5, in which each leg member includes an angular bend thereof.

7. A device of claim 6, including in about a distal terminal portion of each of said two upwardly extending leg members and of each of said two downwardly extending leg members a through-space defined therein of a size and shape receivable of said attaching means.

8. A device of claim 7, in which for each leg member said through-space is about T-shaped with the base of the T-shape extending toward a distal end of the respective leg member.

9. A device of claim 8, in which said attaching means includes a plurality of I-shaped elements insertably linkable through said T-shaped through-space of each of said two upwardly angled leg members and of each of said two downwardly angled leg members.

10. A device of claim 3, in which a substantially flat sheet of a plus-sign shape having four projections are comprised of said leg members and said central portion.

11. A device of claim 1, in which for said two upwardly angled leg members each leg member's linking means includes at least one connector insert having an enlarged head along at least a first one transverse dimension and a slot receivable of said enlarged head insert, and in which for each of said two downwardly angled leg members each leg member's linking means includes a matable end of a connector in a slot, matable with an upwardly angled leg member of an adjacent link.

12. A chain-link device comprising in combination a substantially thin sheet material having a central portion extending along a substantially flat plane and having extending radially laterally therefrom a plurality of leg members including at least two separate extending leg members angling upwardly and at least two other separate leg members angling downwardly; each of said leg members being shaped at about its distal end such that each of said upwardly two angled leg members is linkable to at least one of each of said two downwardly angled leg members of an adjacent link, and each of said two downwardly angled leg members is linkable to at least one of each of said two upwardly angled leg members of an adjacent link.

13. A chain-link device comprising in combination: a substantially thin sheet material having a central substantially planar portion and having radially laterally extending from said central portion a plurality of leg members; said sheet material being of a substantially resilient material such that each of said leg members may be biased to angle in one of upward and downward directions relative to said planar surface; each of said leg members being shaped at about its distal end such that it is matably attachable to a distal end of a leg member of another said sheet material radially extending leg of an adjacent link.

* * * * *